US012618276B2

(12) United States Patent
Hirtsiefer et al.

(10) Patent No.: US 12,618,276 B2
(45) Date of Patent: May 5, 2026

(54) FURNITURE FITTING HAVING AN ADJUSTMENT MECHANISM

(71) Applicant: Samet Kalip Ve Madeni Esya San Ve Tic. A.S., Istanbul (TR)

(72) Inventors: Artur Hirtsiefer, Neunkirchen-Seelscheid (DE); Nurettin Güzeltepe, Istanbul (TR); Izzet Yarar, Istanbul (TR)

(73) Assignee: Samet Kalip Ve Madeni Esya San Ve Tic. A.S., Istanbul (TR)

( * ) Notice: Subject to any disclaimer, the term of this patent is extended or adjusted under 35 U.S.C. 154(b) by 93 days.

(21) Appl. No.: 18/710,563

(22) PCT Filed: Dec. 6, 2021

(86) PCT No.: PCT/TR2021/051358
§ 371 (c)(1),
(2) Date: May 15, 2024

(87) PCT Pub. No.: WO2023/107016
PCT Pub. Date: Jun. 15, 2023

(65) Prior Publication Data
US 2025/0027353 A1 Jan. 23, 2025

(51) Int. Cl.
*E05F 1/08* (2006.01)
*E05F 1/10* (2006.01)

(52) U.S. Cl.
CPC ....... *E05F 1/1058* (2013.01); *E05Y 2201/626* (2013.01); *E05Y 2201/702* (2013.01); *E05Y 2800/404* (2013.01); *E05Y 2900/20* (2013.01)

(58) Field of Classification Search
CPC ... E05F 1/08; E05F 1/10; E05F 1/1041; E05F 1/1058; E05F 1/1091; E05F 1/12;
(Continued)

(56) References Cited

U.S. PATENT DOCUMENTS 3,906,587 A * 9/1975 Little .................... E05F 1/1261 16/289
6,463,627 B1 * 10/2002 Hirtsiefer .............. E05D 15/401 292/DIG. 19
(Continued)

FOREIGN PATENT DOCUMENTS

CN 214062669 U * 8/2021
DE 202014104301 U1 * 12/2015 ............. E05D 15/46
(Continued)

OTHER PUBLICATIONS

Russia Search Report for corresponding patent application No. 2024114704, filing date Dec. 6, 2021, 2 pages (not prior art).
(Continued)

*Primary Examiner* — Chuck Y Mah
(74) *Attorney, Agent, or Firm* — Lucian Wayne Beavers; Patterson Intellectual Property Law, PC

(57) ABSTRACT

A furniture fitting having an adjustment mechanism for adjusting the preload of a spring element, wherein the adjustment mechanism includes a spring bearing and a preloading element, by means of which the spring bearing can be adjusted, wherein the adjustment of the spring bearing increases and/or decreases the preloading of the spring element. The transmission of impermissibly high operating forces is reliably avoided by providing a coupling body which is adjustable relative to the preloading element and which, during the adjustment of the spring bearing, at least partially and/or temporarily bears against the latter, in such a way that a releasable form-fitting and/or frictional connection is formed between the coupling body and the spring bearing, and/or in that a releasable form-fitting and/or frictional connection is formed between the coupling body and the preloading element.

17 Claims, 3 Drawing Sheets

Figure 1:
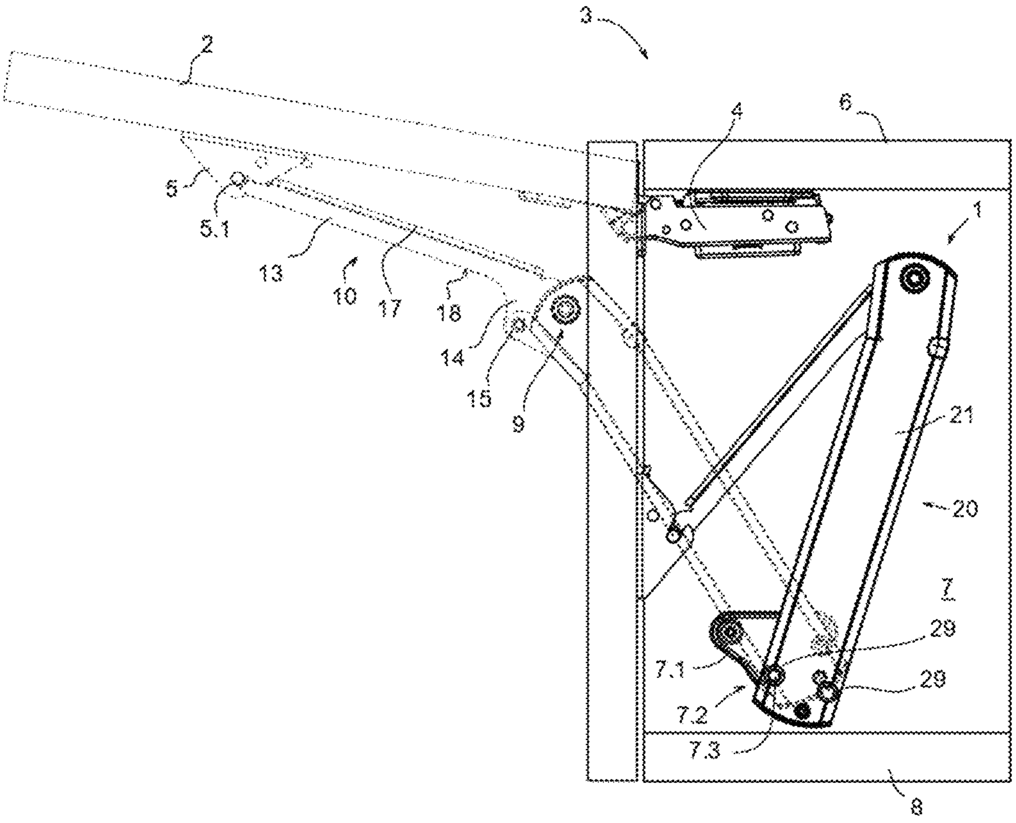

(58) Field of Classification Search
CPC ..... E05F 1/1223; E05F 1/1246; E05F 1/1253; E05F 1/1261; E05F 1/1292; E05F 1/14; E05F 3/20; E05F 3/18; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E06B 3/5045; E05Y 2800/22; E05Y 2800/268; E05Y 2900/20; E05Y 2900/202; E05Y 2900/208; E05Y 2900/21; E05Y 2201/21; E05Y 2201/264; E05Y 2201/212; E05Y 2201/474; E05Y 2201/604; E05Y 2201/626
See application file for complete search history.

(56) References Cited

U.S. PATENT DOCUMENTS 6,766,563 B2 * 7/2004 Lee ...................... A23B 7/0425 16/335
8,096,455 B2 * 1/2012 Viklund .................. B60R 9/055 224/328
8,177,445 B2 * 5/2012 Jones ..................... B41J 3/4071 16/293
8,650,712 B2 * 2/2014 Wach ...................... E05F 1/123 16/236
9,394,736 B2 * 7/2016 Simon ..................... A47F 3/043
9,631,411 B2 4/2017 Lutz
9,909,346 B2 * 3/2018 Holzapfel ............. E05D 15/401
10,711,498 B2 7/2020 Grewe et al.
2006/0284530 A1 12/2006 Hollenstein
2015/0240546 A1 8/2015 Oshima et al.
2015/0351539 A1 12/2015 Baldreich et al.
2016/0160551 A1 6/2016 Lutz
2016/0376823 A1 * 12/2016 Huber ................... E05F 1/1058 312/319.2
2017/0204645 A1 * 7/2017 Lubetz .................... F16H 25/18
2018/0363349 A1 * 12/2018 Kuramochi ............... E05F 5/02
2019/0106921 A1 4/2019 Grewe et al.

FOREIGN PATENT DOCUMENTS

EP 2251514 A1 11/2010
EP 1713996 B1 3/2014
EP 3708753 A1 9/2020
RU 2744234 C1 3/2021
WO 2015027251 A1 3/2015

OTHER PUBLICATIONS

International Search Report and Written Opinion for corresponding patent application No. PCT/TR2021/051358, dated Jul. 21, 2022, 10 pages (not prior art).

* cited by examiner

FURNITURE FITTING HAVING AN ADJUSTMENT MECHANISM

The invention relates to a furniture fitting having an adjustment mechanism for adjusting the preload of a spring element, wherein the adjustment mechanism comprises a spring bearing and a preloading element, by means of which the spring bearing can be adjusted, wherein the adjustment of the spring bearing increases and/or decreases the preloading of the spring element.

Furniture fittings in which adjustment mechanisms may be used to adjust the preload of a spring element include actuators, control arms, hinges, flap supports, retraction and/or ejection devices, particularly for drawers, sliding doors or the like.

From WO 2014/121309 A1 an actuator for moving a movable furniture part is known, wherein an adjustment mechanism is provided to adjust the preload of a spring device. The adjusting mechanism has an adjusting screw and a screw nut, which is adjustable along the thread of the adjusting screw and absorbs the force of the spring device. The preload of the spring device can be adjusted by adjusting the screw nut. It is further provided that the screw nut has a threadless section between its screw head and the thread. If the screw nut is adjusted with respect to the adjusting screw so far in the direction of the screw head that it reaches the threadless section, it is no longer adjusted by a further rotation of the adjusting screw and rotates freely. In order that the nut may re-engage with the thread when the adjusting screw is turned in the opposite direction, a spring element is provided which applies a force to the screw nut acting in the direction towards the thread.

A similar actuator is also known from WO 2015/027251 A1.

It is the task of the invention to provide a furniture fitting with an adjustment mechanism which, with a simple design, allows safe adjustment of the preload of a spring element and reliable prevention of the transmission of impermissibly high operating forces.

The task is solved by providing a coupling body which is adjustable relative to the preloading element and which, during the adjustment of the spring bearing, at least partially and/or temporarily bears against the latter, in such a way that a releasable form-fitting and/or frictional connection is formed between the coupling body and the spring bearing, and/or in that a releasable form-fitting and/or frictional connection is formed between the coupling body and the preloading element.

As a result of the fact that the coupling element partially and/or temporarily bears against the spring bearing during adjustment, a force may be transmitted from the preloading element to the spring bearing via the coupling element.

The releasable connection between the coupling body and the spring bearing, on the one hand, prevents inadmissibly large forces from being exerted on the adjusting mechanism in a particularly simple manner. Impermissibly large forces may occur, for example, if the adjusting mechanism continues to be actuated by a user even though an end position, for example a position of maximum or minimum set preload of the spring element, has already been reached. Also, actuation of the adjustment mechanism by unsuitable means, for example driven tools, may cause impermissibly large forces acting on the adjustment mechanism. On the other hand, the releasable connection also allows permissible operating forces to be reliably transmitted again after the action of the impermissibly high operating force has been prevented.

A releasable connection in this case may, for example, be such that it is releasable in a circumferential direction so that, in the manner of a slip clutch, when a permissible force or a permissible moment is exceeded, for example, the clutch body is rotatable relative to the spring bearing. In this context, a circumferential direction means a direction of rotation about an axis oriented in the direction of adjustment, for example the central longitudinal axis of the preloading element and/or the spring element. Accordingly, a radial direction is perpendicular to this axis. The releasability of the connection may be realized in a particularly advantageous manner in that the connection between the coupling body and the spring bearing is form-fitting and/or frictional.

The spring bearing may also be composed of several components, with the coupling body being relatively adjustable with respect to at least one of these components in order to release the coupling connection. Of course, the spring element may also be composed of several components, for example several springs.

According to a preferred variant of the invention, it may be provided that the preloading element has a threaded section with preferably an external thread and in that the coupling body has a threaded receptacle with preferably an internal thread and in that an adjusting means for adjusting the coupling body relative to the preloading element is formed by means of the threaded section and the threaded receptacle, preferably in that the threaded section can be received in the threaded receptacle in threaded engagement, and in that the adjustment of the coupling body relative to the preloading element is effected at least partially by means of the threaded engagement. Thus, the adjustability of the coupling body with respect to the preloading element may be realized in a simple manner. In particular, the threaded engagement may translate a rotational movement of the preloading element into an adjusting movement of the coupling body, for example into a translatory adjusting movement, which results in an adjustment of the spring bearing at least temporarily and/or partially. Furthermore, the accommodation of the threaded section in the threaded receptacle results in a space-saving design.

If it is provided that the spring bearing has a receiving bore in which the preloading element can be received, wherein the receiving bore preferably does not have a thread, a particularly space-saving design may be achieved. Furthermore, in this way the spring bearing may be guided securely with respect to the preloading element during an adjustment. If no thread is provided on the receiving bore, it is effectively prevented that the receiving bore may, for example, catch on the threaded section of the preloading element. In addition, it may be prevented that a force is directly transmitted from the preloading element to the spring bearing in the adjustment direction. This ensures a defined transmission of force from the preloading element via the coupling body to the spring bearing.

A preferred embodiment is such that one or more coupling elements are provided on the coupling body, in that one or more counter-coupling elements are provided on the spring bearing and in that the coupling element(s) is/are in contact with the counter-coupling element(s) at least partially and/or temporarily during the adjustment of the spring bearing, preferably that the counter-coupling element(s) is/are formed at least partially corresponding to the coupling element(s) and are at least partially and/or temporarily in engagement therewith during the adjustment of the spring bearing.

The coupling elements and counter-coupling elements may preferably be provided on a disc front side of the coupling body and on a front side of the spring bearing, respectively. The coupling elements and the counter-coupling elements may be designed to be released after a maximum force to be transmitted and/or a maximum torque to be transmitted has been exceeded, in order to release the frictional and/or form-fitting connection. In this case, the coupling elements allow safe force or torque transmission below the intended permissible values. In particular, if the adjustment of the coupling body relative to the preloading element is provided via a threaded engagement, the coupling elements and the counter-coupling elements may be designed such that they can effectively counteract a rotational tendency of the coupling body resulting from friction at the thread. Via the design of the coupling elements and the mating coupling elements, it is also possible to define a permissible force or a permissible torque above which the connection is to be released. A mutually corresponding design of the coupling elements and the counter coupling elements may further improve the force transmission between the coupling body and the spring bearing, in particular in the case of a form-fitting and/or frictional releasable connection between the two partners.

According to a preferred embodiment of the invention, it may be provided that the coupling element(s) is/are formed as elevation(s) and/or recess(es), and that the counter-coupling element(s) is/are formed as elevation(s) and/or recess (es). In this way, the coupling elements and/or counter-coupling elements may be realized in a particularly simple manner. Thus, they can be produced by many conceivable manufacturing processes, for example, by primary forming or forming or machining on the coupling body and/or the spring bearing. In particular, provision may also be made to arrange slopes between the elevations and recesses to allow smoother release and to prevent damage to the coupling elements and/or counter coupling elements. The elevations and/or recesses may be provided, for example, on a disc front side of the coupling body or on a front side of the spring bearing.

Preferably, it may also be provided that the one or more coupling elements and/or the one or more counter-coupling elements extend radially and/or are spaced apart from one another in the circumferential direction. A radial extension can be used to achieve improved force and/or torque transmission. Spacing in the circumferential direction may provide for a uniform distribution of force in the circumferential direction on the coupling body and/or the spring bearing.

One variant of the invention may be such that a guide projection adjoins a base body of the spring bearing, the guide projection preferably having a smaller outer perimeter than the base body and, in particular, preferably being of cylindrical design. Here, it may also be provided that the guide projection is arranged on the side of the base-body facing away from the front side. The guide projection may, for example, be integrally formed on the base-body of the spring bearing. A guide section of the preloading element, for example the threaded section, may be rotatably guided in the guide projection. It is conceivable that the receiving bore extends through guide projection, so that increased support of the spring bearing relative to preloading element results.

If it is provided that the spring element is received on the guide projection of the spring bearing and/or is supported on the base body of the spring bearing, a secure mounting of the spring element is achieved. For example, the guide projection prevents the spring element from buckling, especially if it is designed as a compression spring. Further, in this way it may be effectively prevented that the spring element collides with other components of the control arm and/or of the adjustment mechanism, for example that it gets caught on housing parts. In particular, if it is provided that the base body has a larger outer perimeter than the guide projection, the spring element may be supported on the base body, for example with a spring end.

According to an advantageous embodiment of the invention, it may be provided that the preloading element is indirectly or directly adjustable by means of a tool, in particular that the preloading element has a head, on which an engagement structure is provided, in that the engagement structure is preferably formed by protrusions and depressions, particularly preferably that the engagement structure allows the engagement of the tool, which in particular is aligned with its central longitudinal axis substantially perpendicular to the central longitudinal axis of the preloading element. In this way, a user-friendly operation of the adjustment mechanism may be achieved, so that an adjustment may be effected with readily available means. For example, a screwdriver with a Phillips, a Torx, or other type of profile may be used for this purpose. If the engagement structure is provided at the head, the number of necessary parts can be reduced. If the tool is aligned perpendicular to the central longitudinal axis of the preloading element, a space-saving design can be achieved for typical installation situations in furniture fittings.

One possible variant of the invention may be characterized in that the coupling body has a disc body with a centering projection which projects beyond a disc front side of the disc body and preferably has a smaller outer perimeter than the disc body and in that the spring bearing has, on a front side, a centering receptacle which is preferably designed to correspond to the centering projection, and in that the centering projection can be received in the centering projection. This results in a secure mounting of the coupling body on the spring bearing. In addition, it may be ensured in this way that the contact surfaces are in correct alignment with one another after the releasable connection has been released and the connection is restored. Of course, it is also conceivable that a centering projection is provided on the spring bearing and a centering receptacle is provided on the coupling body.

According to a preferred embodiment of the invention, it is proposed that the threaded section of the preloading element is adjoined by an extension which preferably has a smaller outer perimeter than the threaded section and further preferably does not have a thread. The extension may adjoin the threaded section on the side thereof remote from the head of the preloading element. Thus, it may be easily provided that transmission is prevented not only when the permissible force is exceeded, but also when a permissible travel is exceeded. For example, when the coupling body is adjusted in the direction of increasing the preloading force beyond the permissible travel, the internal thread of the threaded receptacle becomes disengaged from the threaded section of the preloading element and may thus rotate freely. In this case, the coupling body remains spring preload of the spring element. Further actuation in the direction of increasing the preload results in the internal thread of the threaded receptacle jumping over the thread entrance of the threaded section with each rotation, thus resulting in an acoustic and/or haptic feedback for the user. At the same time, the coupling body is securely held or guided on the extension and aligned in such a way that threaded engagement may be reliably achieved again when the direction of adjustment is reversed.

According to an advantageous further development of the invention, it may be provided in that the spring bearing has one or more projections which preferably project radially from the base body of the spring bearing, in that the projection(s) has/have one or more guide surfaces, and/or in that one or more spring bearing sliding surfaces are provided on the base body of the spring bearing, and/or in that one or more guide lugs are provided on the base body of the spring bearing. In this way, it can be achieved that the spring bearing is guided, for example, by corresponding guides which are provided on the furniture fitting, or which may also be part of the adjustment mechanism.

If it is provided that on the furniture fitting one or more guide regions are provided for guiding the one or more spring bearing sliding surfaces and/or one or more spring bearing counter surfaces are provided for guiding the one or more guide surfaces and/or one or more housing walls are provided for guiding the one or more guide surfaces, and/or one or more guide slots are provided for guiding the one or more guide lugs, the spring bearing is guided safely. In particular, twisting of the spring bearing may be effectively prevented.

According to an advantageous embodiment of the invention, it is proposed that a receptacle is provided on the furniture fitting, in which receptacle the head of the preloading element is rotatably accommodated, the receptacle preferably being designed as a cylindrical receptacle and/or in that a tool opening is provided on the furniture fitting, into which a tool may be inserted in such a way that it comes into engagement with the head, in particular with the engagement structure, wherein the tool opening is preferably formed by a cylindrical receptacle on which the tool may be supported, particularly preferably, the tool may be supported at the tool opening in and/or against the direction facing the head. Thus, a secure support of the preloading element and/or the tool may be achieved with little effort. The support of the tool also ensures reliable engagement with the engagement structure.

A furniture fitting according to the invention may be such that the spring element is supported by a first spring end on the spring bearing and by a second spring end on a thrust piece of the furniture fitting and in that the thrust piece at least partially transmits the preloading force of the spring element to a control part of the furniture fitting.

Figure 2:
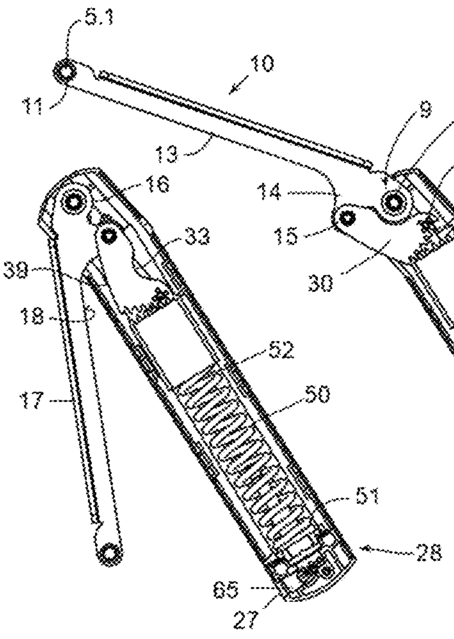
Figure 3:
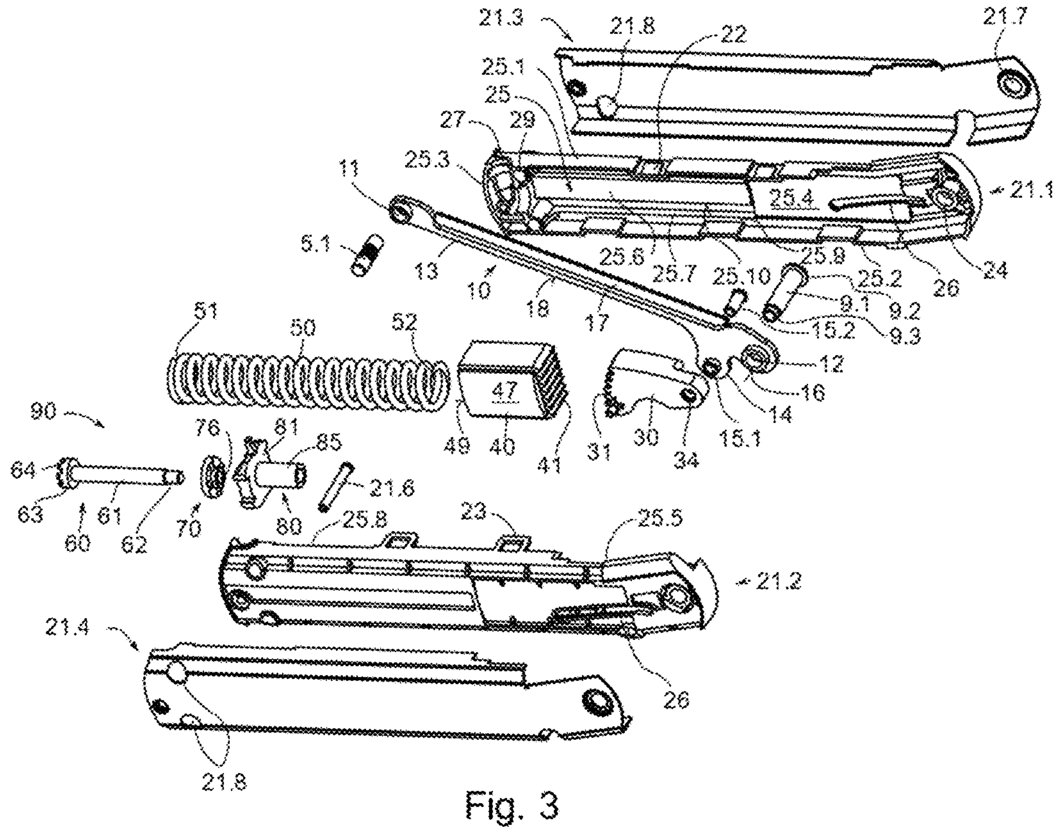
Figure 4:
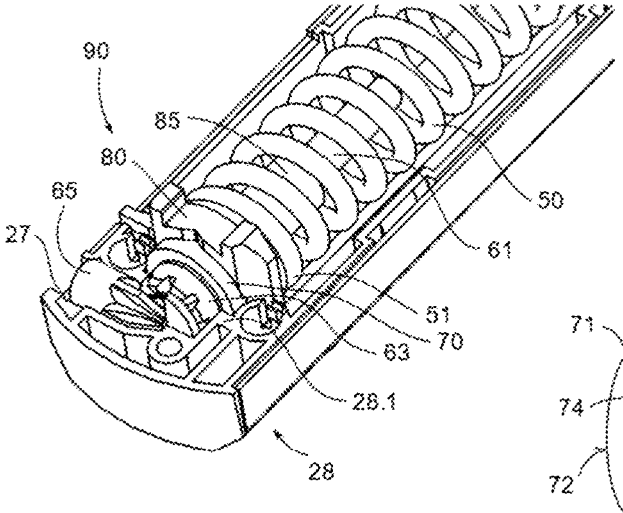
Figure 5:
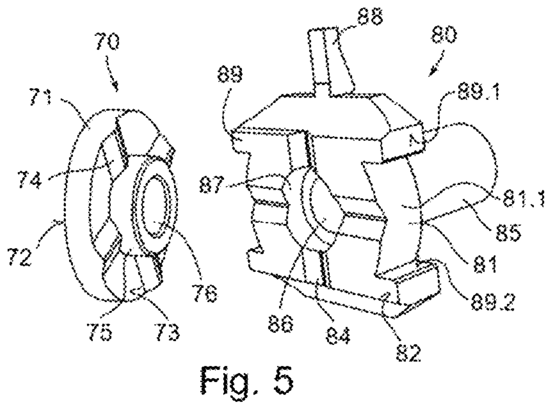
Figure 6:
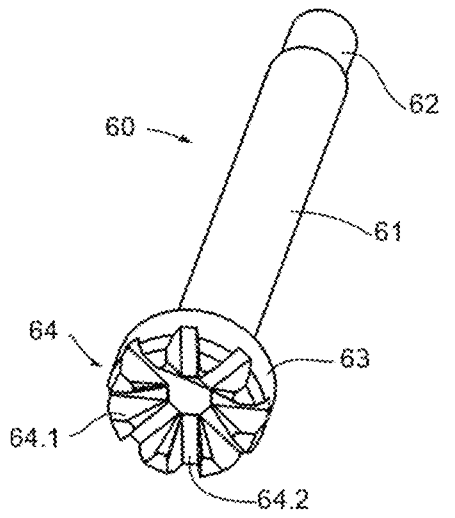
Figure 7:
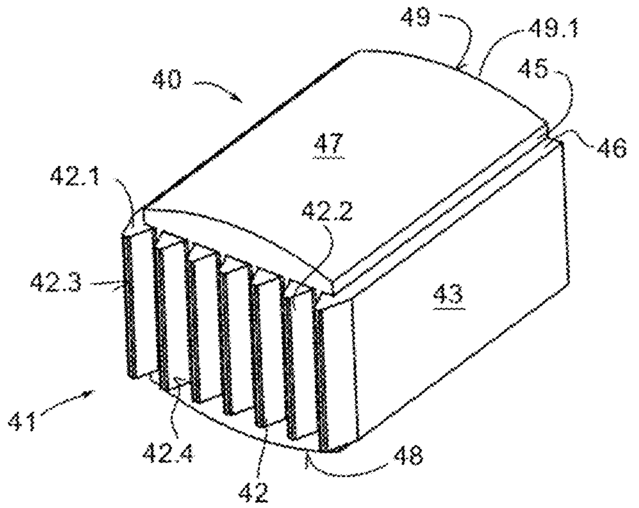
Figure 8:
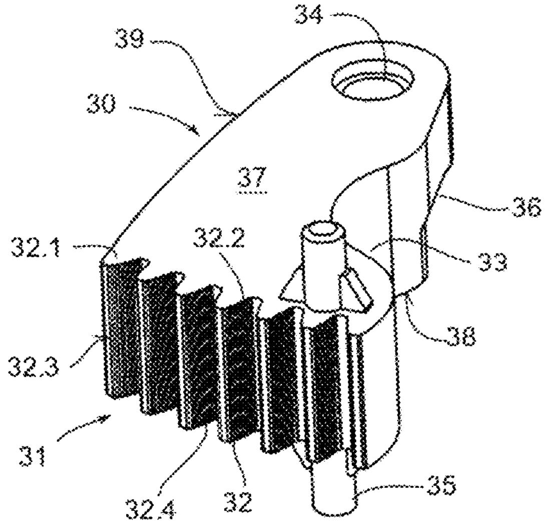

The invention is explained in more detail below with reference to an example of an embodiment shown in the drawings, of which show:

FIG. 1 a piece of furniture 3 with a hinged flap 2 and a control arm 1, FIG. 2 the control arm 1 in a closed and in an open position, FIG. 3 the control arm 1 in an exploded view, FIG. 4 an end region 28 of a second arm section 20 of the control arm 1, FIG. 5 a coupling body 70 and a spring bearing 80 of an adjustment mechanism 90, FIG. 6 a preloading element 60 of the adjustment mechanism 90, FIG. 7 a thrust piece 40 of the control arm 1 and FIG. 8 a control part 30 of the control arm 1.

FIG. 1 shows a piece of furniture 3 with a hinged flap 2 and a control arm 1. Solid lines show a closed position, dashed lines show an open position. As shown, the piece of furniture 3 may be a cabinet with a cabinet lid 6, a cabinet bottom 8 and a side wall 7. The flap 2 may be hinged to the cabinet lid 6 by means of a furniture hinge 4 such that it can be pivoted about a horizontal axis. A flap bearing 5 may be attached to the flap 2 at a distance from the pivot axis of the furniture hinge 4. The control arm 1 may be coupled to the flap bearing 5 in an articulated manner.

As can be further seen from FIG. 1, the control arm 1 has a first arm section 10 and a second arm section 20 which are pivotally connected to each other. As shown, the first arm section 10 and the second arm section 20 may be connected to each other by means of a pivot bearing 9.

In the embodiment shown, the first arm section 10 is connected to the flap 2 of the furniture 3 by means of the flap bearing 5. For this purpose, for example, a flap bearing receptacle 11 may be provided on the first arm section 10 at its end region facing away from the pivot bearing 9, which may be in the form of a bore which accommodates a flap bearing pin 5.1, as can be seen, for example, in FIG. 3.

The second arm section 20 may be pivotably connected to a side wall 7 of the piece of furniture 3. For this purpose, a control arm bearing 7.2 may be provided on the second arm section 20 in the area of its end facing away from the pivot bearing 9. The control arm bearing 7.2 may be formed as a passage 29 which accommodates, for example, a bearing pin 7.3. Presently, a mounting plate 7.1 is attached to the side wall 7 of the piece of furniture 3, which carries the bearing pin 7.3.

Deviating from the example shown in FIG. 1, the first arm section 10 may of course also be connected to the piece of furniture 3 and the second arm section 20 may be coupled to the movable furniture part or flap 2.

As can be further seen from FIG. 1, during an opening or closing movement of the flap 2 relative to the furniture 3, the first arm section 10 and the second arm section 20 are pivoted relative to each other, for example about the pivot bearing 9. The first arm section 10 and the second arm section 20 can consequently be pivoted relative to each other between an opening position and a closing position.

It is also conceivable to use the control arm 1 with other kinds of furniture 3. In particular, the movable furniture part 2 may also be pivotable about a differently oriented axis, for example a vertical axis, as is usually the case with doors, for example. Furthermore, it is conceivable that only one of the arm sections 10, 20 is pivotably mounted on the respective associated piece of furniture 3 or movable furniture part 2. Furthermore, arrangements are also conceivable in which no further pivot axis is provided in addition to the axis formed by the pivot bearing 9, for example if no furniture hinge 4 is used.

As in the embodiment shown in the figures, the second arm section 20 may comprise a housing 21 which forms a receiving space 25. The housing 21 may be divided into two housing halves 21.1, 21.2, as can be seen, for example, in FIG. 3.

FIG. 2 shows the control arm 1 in a closed position and in an open position, with the housing 21 displayed open. In other words, one of the housing halves 21.1, 21.2 is not shown in FIG. 2.

FIG. 2 shows that the first arm section 10 may be formed by an elongate portion 13 on which a reinforcement 17, for example in the form of a bend, may be provided. In the area of the flap bearing 5, the first arm section 10 may have a flap bearing receptacle 11, which may be in the form of a bore, as in the embodiment shown. The flap bearing receptacle 11 may, for example, receive the flap bearing pin 5.1 to form the flap bearing 5.

In the area of the end of the first arm section 10 opposite the flap bearing 5, a pivot bearing receptacle 12 may be provided on the arm section 10. As can be seen from the figures, the pivot bearing receptacle 12 may be designed as a bore which serves to receive a pivot bearing pin 9.1.

As can be further seen in FIG. 2, a control part 30 is hingedly coupled to the first arm section 10. Furthermore, a control lever 14 may be provided in the area of the end of the first arm section 10 facing the pivot bearing 9. As in the present case, the control part 30 may be coupled to the control lever 14. The control lever 14 may be integrally formed on the elongate portion 13, as can be seen from FIG. 2. However, it is also conceivable that the control lever 14 is attached to the first arm section 10 in other ways, for example by releasable or non-releasable connections such as screwing, riveting or gluing.

The control part 30 may be connected to the first arm section 10 via a control bearing 15. As in the embodiment example shown in the figures, the control bearing 15 may be provided on the control lever 14 of the first arm section 10. However, it would also be conceivable to provide the control bearing 15, for example, directly on the elongate portion 13 of the first arm section 10 or at another location. The control bearing 15 may, for example, be provided as a control bearing bore 15.1 which receives a control bearing pin 15.2 to form the control bearing 15.

The first arm section 10 may further comprise a contact surface 18. For example, the contact surface 18 may be arranged on a surface of the elongate portion 13 facing the control part 30 in the closed position. Accordingly, the contact surface 18 may be provided on the side of the elongate portion 13 opposite the reinforcement 17. However, it is also conceivable to provide the reinforcement 17 on the side facing the control part 30 in the closed position or on any side of the first arm section 10. Accordingly, the contact surface 18 may also be provided on the reinforcement 17.

Furthermore, the first arm section 10 may have a stop surface 16, which, for example, may be arranged on a surface of the elongate portion 13 facing the control part 30 in the closed position in the area in proximity of the pivot bearing 9.

A possible design variant of the control part 30 is shown in more detail in FIG. 8. The control part 30 may, for example, have a control bearing receptacle 34 which receives a control bearing pin 15.2. As in the present case, for example, the control bearing receptacle 34 may be designed as a bore. The control bearing receptacle 34, the control bearing pin 15.2 and the control bearing bore 15.1 of the first arm section 10 may thus form the control bearing 15.

The control part 30 may further comprise a recess 36. As can be seen in FIG. 8, the recess 36 may be provided in an underside 38 of the control part 30 in the area of the control bearing receptacle 34. By means of the recess 36, the control part 30 may be connected to the first arm section 10 in a space-saving manner. For example, the control lever 14 of the first arm section 10 may be receivable in the recess 36. However, it is also conceivable to provide a recess 36 not on an underside 38, but on an upper side 37 of the control part 30. A recess 36 may also be provided, for example, between the upper side 37 and the underside 38 of the control part 30, so that a fork-like receptacle is formed in which the first arm section 10 or the control lever 14 can be received.

As can be further seen in FIG. 8, the control part 30 has a control surface 31. This may be provided, for example, on a side of the control part 30 facing away from the control bearing 15 or the control bearing receptacle 34. The control surface 31 may have any desired curvature, in the present case it is convexly curved. Furthermore, the control surface 31 may comprise one or more positive-locking elements 32. As in the shown embodiment, a toothing 32.1 with teeth 32.2 is provided at the control surface 31, which teeth have tooth flanks 32.4 and head surfaces 32.3. The teeth 32.2 form the positive locking elements 32. The toothing 32.1 may be superimposed on the curvature of the control surface 31. The toothing 32.1 may be straight toothing, but other types of toothing such as helical toothing are also conceivable. The head surfaces 32.3 and/or the tooth flanks 32.4 may also be curved or flat.

A counter contact surface 39 may further be provided on the control portion 30. For example, the counter contact surface 39 may be provided on a side surface of the control part 30. A stop 33 may also be provided on the control part 30, which may be formed by a contoured recess in the side of the control part 30 opposite the counter contact surface 39.

As can be seen from FIG. 8, the control part 30 may have one or more guide projections 35. For example, a guide projection 35 may be arranged on the upper side 37 and/or on the underside 38 of the control part 30 at a distance from the control bearing receptacle 34. The guide projections 35 may be formed as pin-shaped projections, which may be further reinforced by means of ribs or other types of reinforcing elements. The guide projections 35 may, for example, be integrally formed on the control part 30.

FIG. 7 shows a possible design of the thrust piece 40. The thrust piece 40 has a counter control surface 41. In the present case, the counter control surface 41 has no curvature, but it may have a curvature. Furthermore, the counter control surface 41 may comprise one or more counter positive-locking elements 42. As in the embodiment shown, a mating counter toothing 42.1 may be provided on the counter control surface 41 with teeth 42.2 having tooth flanks 42.4 and head surfaces 42.3. The teeth 42.2 form the counter positive locking elements 42. The counter-toothing 42.1 may be superimposed on the curvature of the counter-control surface 41. The counter toothing 42.1 may be a straight toothing, but other types of toothing such as helical toothing are also conceivable. Also, the head surfaces 42.3 and/or the tooth flanks 42.4 may be curved or flat.

The thrust piece 40 may further comprise a back surface 49. For example, the back surface 49 may be provided on the side of the thrust piece 40 opposite the counter control surface 41. A spring receptacle 49.1 may be arranged at the back surface 49. It is conceivable that the spring receptacle 49.1 is formed directly by the back surface 49. However, it is also conceivable that the spring receptacle 49.1 is provided as a hole, for example a blind hole, or as a projection, for example a stud on the back surface 49 or elsewhere on the thrust piece 40.

The thrust piece 40 may further comprise a guide surface 47 and an opposite lower surface 48, which may extend from the counter control surface 41 to the back surface 49. As can be seen from FIG. 7, the guide surface 47 and the lower surface 48 may have the same design. However, it is also conceivable to provide different designs. In the present case, guide surface 47 and lower surface 48 are convexly curved.

Furthermore, the thrust piece 40 may have side surfaces 43 that lead, for example, from the counter control surface 41 to the back surface 49 and from the guide surface 47 to the lower surface 48. Presently, the side surfaces 43 are designed to be flat, but they may also have a curvature.

Sliding surfaces 45, 46 may also be provided on the thrust piece 40. In the present case, the sliding surfaces 45, 46 are formed as flat, offset surfaces that are angled to the guide surface 47 and the lower surface 48 or to the side surfaces 43. Thus, the illustrated embodiment of the thrust piece 40 has eight sliding surfaces 45, 46. However, it is conceivable to provide a larger or smaller number of sliding surfaces 45, 46.

As can be seen from FIG. 2, the thrust piece 40 is mounted on the second arm section 20. It may, for example, be mounted so as to be displaceable relative to the second arm section 20. The control surface 31 of the control part 30 is in contact with the counter control surface 41 of the pressure piece 40.

As can further be seen in FIG. 2, a spring element 50 is also provided which pretensions the thrust piece 40 relative to the control part 30. The spring element 50 shown is designed as a compression spring, but other types of springs are also conceivable, such as tension springs, disc springs, leaf springs or spiral springs. The spring element 50 may have a first spring end 51 and an opposite second spring end 52.

The second spring end 52 may be supported on the back surface 49 of the thrust piece 40, in this case on the spring receptacle 49.1. The first spring end 51 may, for example, be supported on the second arm section 20. In the present case, the first spring end 51 is supported relative to a spring bearing 80, which may be arranged in an end region 28 of the second arm section 20.

A possible design of the housing 21 is explained in more detail below with reference to FIG. 3. As can be seen from this illustration, the housing 21 may have two housing halves 21.1, 21.2. The housing 21 may have a receiving space 25 which may be surrounded by housing walls 25.1, 25.2, 25.3, 25.4.

The housing 21 may have passages 29 in its end region 28. For example, two passages 29 may be provided, wherein one passage 29 may serve to receive the bearing pin 7.3 and thus to form the control arm bearing 7.2. Furthermore, a pivot bearing bore 24 may be provided in a region of the housing 21 facing away from the end region 28. As in the present case, the pivot bearing bore 24 may serve to receive the pivot bearing pin 9.1 and thus to form the pivot bearing 9.

A guide 26 may be provided in one housing wall 25.4 or in several housing walls, which may be designed as a guide groove or a guide slot. A guide is for example provided in both housing halves 21.1, 21.2. However, it is also conceivable to provide a guide in only one housing half to form the guide 26. The guide projection 35 or the guide projections 35 of the control part 30 may be guided in the guide 26.

Furthermore, the housing 21 may have a guide region 25.6 on a housing wall 25.4. The guide region 25.6 is designed as a surface with a concave curvature. The guide region 25.6 may guide the guide surface 47 of the thrust piece 40.

In addition, counter sliding surfaces 25.7, 25.9 may be provided on the housing 21. These are designed to correspond to the sliding surfaces 45, 46 of the thrust piece 40. The sliding surfaces 45, 46 of the thrust piece 40 may be guided on the counter sliding surfaces 25.7, 25.9 of the housing 21.

The housing 21 may be formed by two housing halves 21.1, 21.2, which may be symmetrical to each other in their essential components. In the embodiment shown, the housing halves 21.1, 21.2 differ in that latching elements 22 may be arranged on one housing half 21.1 and counter latching elements 23 may be arranged on the other housing half 21.2. The latching elements 22 may, for example, be designed as latching lugs and the counter latching elements 23 as corresponding tabs.

The housing 21 may also have a housing opening 25.5, which may, for example, be provided as a recess in the housing wall 25.1 of both housing halves 21.1, 21.2 in an area directly or indirectly adjoining the pivot bearing bore 24. The housing opening 25.5 allows the first arm section 10 and the control part 30 to pass through the housing 21.

A further opening of the housing 21 may be provided by a guide slot 25.8, which may also be provided as a recess in the housing wall 25.1 of both housing halves 21.1, 21.2. The guide slot 25.8 may connect indirectly or directly to the end region 28 of the housing 21. The guide slot 25.8 may serve to guide a guide lug 88 of the spring bearing 80.

Furthermore, the housing 21 may have a tool opening 27, which may be designed as a hole in the housing wall 25.1, preferably at the end region 28 of the housing 21.

As can be seen from FIG. 3, covers 21.3, 21.4 may be provided on the housing halves 21.1, 21.2. In the present case, the covers 21.3, 21.4 are designed in such a way that they at least largely cover the housing halves 21.1, 21.2. However, components of the housing half 21.1 that are essential for the function and assembly, such as housing opening 25.5, guide slot 25.8, pivot bearing bore 24, passages 29 and/or tool opening 27, may be left completely or partially free and accessible.

In FIG. 4, an end region 28 of an embodiment of the second arm section 20 is shown in more detail. As previously mentioned, the spring element 50 may be supported on a spring bearing 80. The spring bearing 80 may be part of an adjustment mechanism 90, by means of which the preload of the spring element 50 can be adjusted. As can be further seen in FIG. 4, the adjustment mechanism 90 may comprise a preloading element 60, a coupling body 70 and the spring bearing 80.

A possible embodiment of the preloading element 60 is shown in more detail in FIG. 6. The preloading element 60 may have a threaded section 61 that is cylindrical, for example. The threaded section 61 may be adjoined on one side by a extension 62. In the present case, the extension 62 has a smaller diameter than the threaded section 61 and does not have a thread. The extension 62 may, for example, be integrally formed on the threaded section 61 or be detachably or non-detachably connected thereto, for example by means of a screw or adhesive connection.

Furthermore, a head 63 of the preloading element 60 may be indirectly or directly connected to the threaded section 61. The head 63 may for example be cylindrically shaped and have a larger diameter than the threaded section 61. Furthermore, the head 63 may be arranged opposite the extension 62. The head 63 may have an engagement structure 64, which may, as shown in FIG. 6, be formed by protrusions 64.1 and depressions 64.2 arranged in succession in the circumferential direction. The engagement structure 64 may preferably be designed to enable positive transmission of force between a tool 65 and the preloading element 60. In the present case, the engagement structure 64 is configured such that a tool 65 in the form of a screwdriver or a screw bit with a cross-slotted contour may engage therein, as can be clearly seen in FIG. 4. However, other configurations of the engagement structure 64 are also conceivable. Furthermore, it is conceivable that the force transmission between a tool 65 and the preloading element 60 is not or only partially positive. In this case, the force transmission may, for example, be partially or completely non-positive and thus partially or completely frictional. In such a design, the engagement structure 64 may be dispensed with, for example.

FIG. 5 shows in more detail possible designs of the coupling body 70 and the spring bearing 80.

The coupling body 70 may be cylindrical; it is shown here as a disk body 71. The coupling body 70 may have a largely flat rear side 72. Opposite the disk rear side 72 may be arranged a disk front side 73. As in the embodiment shown, a centering shoulder 75 may be provided on the coupling body 70, which may be cylindrical and may have a smaller outer diameter than the disc body 71.

Furthermore, the coupling body 70 may be penetrated by a screw receptacle 76, which may be designed as a through-hole with an internal thread.

Coupling elements 74 may be provided on the front side 73 of the disc, for example in the form of elevations 74 protruding above the front side 73 of the disk and extending radially from the outer circumference of the disk body 71 to the centering projection 75. However, other designs of the elevations 74 are also conceivable. For example, they do not have to run radially. It would also be conceivable to provide only one elevation 74 on the coupling body 70. It would also be possible to arrange them not on the front side 73 of the disc but, for example, on the centering projection 75.

As can be further seen from FIG. 5, the spring bearing 80 may have a base body 81, which may be disc-shaped and have a front side 82. Opposite the front side 82, the base body 81 may be adjoined by a guide projection 85, which may be cylindrical. The base body 81 may also have a spring bearing sliding surface 81.1, which may be designed as a curved outer surface of the base body 81.

Furthermore, FIG. 5 shows that the spring bearing 80 may be penetrated by a receiving bore 86. The receiving bore 86 may be designed as a cylindrical through bore and without thread. In the region of the front side 82 of the base body 81, the receiving bore 86 may furthermore be surrounded by a centering receptacle 87. Conceivably, the centering receptacle 87 may be a cylindrical recess with an enlarged diameter compared to the receiving bore 86.

Counter-coupling elements 84, for example in the form of recesses 84 may be arranged on the front side 82 of the base body 81. Preferably, recesses 84 are formed to correspond to the elevation 74 or elevations 74 on the front side 73 of the coupling body 70.

There may be further projections 89 provided on the base body 81 of the spring bearing 80. The projections 89 may have guide surfaces 89.1, 89.2. In the present case, guide surfaces 89.1, 89.2 are arranged at an angle to one another.

FIG. 4 shows the end region 28 of the second arm section 20 with the adjustment mechanism 90, wherein the bias of the spring element 50 is in a minimum adjustment state. As can be seen from FIG. 4, the head 63 of the preloading element 60 may be received rotatably in a receptacle 28.1 of the housing 21. For example, the receptacle 28.1 may be a cylindrical recess.

The coupling body 70 may have its disc rear side 72 in contact with the head 63 of the preloading element 60, with the threaded portion 61 of the preloading element 60 received in the threaded receptacle 76 of the coupling body 70. In other words, the coupling body 70 may be screwed onto the preloading element 60.

As can be seen in FIG. 4, the disc front side 73 of the coupling body 70 may rest against the front side 82 of the spring bearing 80. For example, the elevations 74 of the coupling body 70 may engage in the recesses 84 of the spring bearing 80. Furthermore, the centering projection 75 of the coupling body 70 may be received in the receiving bore 86 of the spring bearing 80.

The spring element 50 may now bear against the spring bearing 80 on the side opposite the front side 82 of the spring bearing 80, as shown in FIG. 4. The threaded section 61 of the preloading element 60 may pass through the coupling body 70 and the spring bearing 80 as shown in FIG. 4. The guide projection 85 of the spring bearing 80 and the threaded section 61 and the extension 62 of the preloading element 60 may be located inside the spring element 50 as shown in FIG. 4.

To mount the control arm 1, for example, the cover 21.3 may first be placed on the housing half 21.1. The pivot bearing pin 9.1 may then be guided through the orifice 21.7 of the cover 21.3 corresponding to the pivot bearing bore 24 and through the pivot bearing bore 24. To fix the pivot bearing pin 9.1, it may be provided that the latter has a pin head 9.2 which bears against the orifice 21.7.

Subsequently, the first arm section 10 may be assembled with the control part 30 to form a unit by means of the control bearing pin 15.2 guided through the control bearing bore 15.1 of the first arm section 10 and the control bearing receptacle 34 of the control part 30. This assembly may then be fitted onto the pivot bearing pin 9.1 with the pivot bearing receptacle 12. Furthermore, the guide projection 35 of the control part 30 may be inserted into the guide 26 of the housing 21.

In the following, the coupling body 70 may be screwed onto the preloading element 60. Thereafter, the spring bearing 80 may be fitted with its receiving bore 86 onto the threaded section 61 and brought into contact with its front side 82 with the disc front side 73 of the coupling body 70. Thus, the adjustment mechanism 90 is assembled.

Now the assembled adjustment mechanism 90 may be inserted into the receiving space 25 of the housing 21 by inserting the head 63 of the preloading element 60 into the receptacle 28.1 of the housing 21. Here, the spring bearing sliding surface 81.1 of the spring bearing 80 may be placed against the guide region 25.6 of the housing 21. Furthermore, the guide surfaces 89.1 may be brought into contact with the housing wall 25.4 and the guide surfaces 89.2 may be brought into contact with the spring bearing counter surface 25.10.

The spring element 50 may then be slid onto the adjustment mechanism 90 so that its first spring end 51 comes into contact with the spring bearing 80.

Now the thrust piece 40 may be inserted, whereby the thrust piece 40 is brought into contact with the second spring end 52 of the spring element 50 with its back surface 49 or its spring receptacle 49.1.

After insertion, the thrust piece 40 may rest with its guide surface 47 against the guide region 25.6 of the housing 21. Furthermore, it may rest with its sliding surface 45 against the counter sliding surface 25.7 and with its sliding surface 46 against the counter sliding surface 25.9 of the housing 21.

After the control part 30 has been brought with its control surface 31 into contact with the counter control surface 41 of the thrust piece 40, the second housing half 21.2 may be assembled with the first housing half 21.1. If it is provided that the pivot bearing pin 9.1 has a pin screw receptacle 9.3 at its end opposite from the pin head 9.2, a screw may then be used, for example, to secure the cover 21.4 and the second housing half 21.2 to the first housing half 21.1. A similar connection technique is conceivable for use with the passages 29 of the housing 21. Further, a retaining bolt 21.6 may be provided to connect the covers 21.4, 21.3 and the housing halves 21.1, 21.2.

The control arm 1 may now be mounted on a piece of furniture 3 with a movable furniture part, for example a flap 2, for use with the furniture 3. For this purpose, a mounting plate 7.1 may be mounted on a side wall 7 of the furniture 3, for example, which carries a bearing pin 7.3. The control arm 1 may then be slid onto the bearing pin 7.3 by means of one of the passages 29 to form the control arm bearing 7.2. The connection to the movable furniture part may be made, for example, by mounting a flap bearing 5 on the movable furniture part or flap 2. The first arm section 10 of the control arm 1 may then be connected to the flap bearing 5 by means of the flap bearing pin 5.1, which is guided through the flap bearing receptacle 11.

In the following, the operation of the control arm 1 is explained in more detail with reference to FIG. 2.

As can be seen in FIG. 2, the control part 30 rests with its control surface 31 against the counter control surface 41 of the thrust piece 40. Here, the thrust piece 40 is biased against the control part 30 by means of the spring element 50.

When the control arm 1 is transferred from an open position, as shown on the right in FIG. 2, to a closed position, as shown on the left in FIG. 2, the first arm section 10 pivots relative to the second arm section 20, in this case about the pivot bearing 9.

When the first arm section 10 pivots relative to the second arm section 20, the control part 30 rolls with its control surface 31 on the counter control surface 41 of the thrust piece 40. In the present case, the control part 30 is coupled in an articulated manner to the control lever 14 of the first arm section 10 by means of the control bearing 15, as a result of which the pivoting movement of the first arm section 10 is transmitted to the control part 30.

In the open position, the preload of the spring element 50 is transmitted to the first arm section 10 via the thrust piece 40 and the control part 30. The first arm section 10 may, as in the present case, rest with its stop surface 16 against the stop 33 of the control part 30, where it is held by the preload.

At the beginning of the pivoting movement starting from the closed position, the thrust piece 40 is displaced by the control part 30 on the second arm section 20 against the pretension of the spring element 50. In the present case, the preload of the spring element 50 is initially increased.

The design of the control surface 31 and the counter control surface 41 may be used to selectively adjust the characteristics of the displacement of the control part 30 depending on the pivot angle. Thus, the course of the preload of the spring element 50 can also be specifically modified. In the present case, the control surface 31 is convexly curved and the counter control surface 41 is flat.

In the embodiment shown, the toothing 32.1 of the control surface 31 meshes with the counter toothing 42.1 of the thrust piece 40 during the rolling motion.

When the control surface 31 rolls on the counter control surface 41 during the closing movement, the preload is initially increased starting from the open position. As can be seen from FIG. 2, the design of the control surface 31 and/or the counter control surface 41 may be such that shortly before the closed position is reached, a dead center is passed over at which the dependence of the preload of the spring element 50 on the angle of the pivoting is reversed and/or at which a local minimum of the preload is reached. The desired preload of the spring element 50 in the open and closed position may thus be designed independently of each other via the design of the control surface 31 and/or the counter control surface 41.

However, it is also conceivable that no dead center is provided, or that dead centers are provided at any other position of the closing movement, for example at the closed position.

During the rolling of the control part 30 and the thrust piece 40, no slip or at least only negligible slip occurs between the control surface 31 and the counter control surface 41. The instant center of the relative movement between control part 30 and thrust piece 40 may move along control surface 31 and/or counter-control surface 41 during the rolling movement.

In this case, the force exerted by the thrust piece 40 on the control part 30 has substantially the same direction as the force exerted by the first arm section 10 on the control part 30. The lines of action are thus essentially collinear.

In the present case, the thrust piece 40 is guided with its guide surface 47 on the guide region 25.6 of the housing 21 with its sliding surface 45 on the counter sliding surface 25.7 and with its sliding surface 46 on the counter sliding surface 25.9 of the housing 21. In particular, the counter sliding surfaces 25.7 may absorb forces acting on the thrust piece 40 transversely to the direction of the pretension of the spring element 50.

In the embodiment shown, in the closed position, the first arm section 10 rests with its contact surface 18 against the housing wall 25.1. However, it is also conceivable that the contact surface 18 in the closed position comes into contact, for example, with the counter contact surface 39 of the control part 30. In both ways, the control arm 1 is held securely in its closed position. In the example shown, the first arm section 10 rests with the contact surface 18 against the housing wall 25.1 under pretension of the spring element 50.

Accordingly, starting from the closed position, a dead center may first be traversed during an opening movement. When the control arm 1 is used with a piece of furniture 3 having a movable furniture part 2, for example a flap 2, the flap may thus be securely held on the piece of furniture 3 in a closed position.

The operation of the adjustment mechanism 90 is explained in more detail below with reference to FIG. 4.

By means of the adjustment mechanism 90, the preload of the spring element 50 may be adjusted. For this purpose, a tool 65 may, for example, be guided through a tool opening 27 of the housing 21 and engaged with the head 63 of the preloading element 60. The tool 65 may be a screwdriver or a screw bit with a cross-head contour, for example a Phillips screw drive. The cross-head contour may be engaged with an engagement structure 64 on the head 63 in such a way that an actuation, in particular a rotation of the tool 65 is translated into a rotation of the preloading element 60.

Rotation of the preloading element 60 causes the coupling body 70 to move relative to the preloading element 60 by rotating the threaded section 61 relative to the threaded receptacle 76. Unintentional rotation of the coupling body 70 may be prevented by providing that the coupling body 70 engages with its elevations 74 in recesses 84 of the spring bearing 80, the spring bearing 80 being mounted in a rotationally fixed and displaceable manner with respect to the second arm section 20, for example with respect to the housing 21. The guide surfaces 89.1 of the spring bearing 80 may bear on the housing wall 25.4 and the guide surfaces 89.2 bear on the counter-surface 25.10 of the housing 21.

Accordingly, when the coupling body 70 is displaced relative to the preloading element 60, the spring bearing 80 is also displaced relative to the preloading element 60, the preloading element 60 being supported relative to the second arm section 20, in this case relative to the receptacle 28.1 of the housing 21.

To increase the preload of the spring element 50, the preloading element 60 may now be rotated by means of the tool 65, starting from the state of minimum preload shown in FIG. 4, and the coupling body 70 and the spring bearing 80 are thus displaced relative to the preloading element 60. The direction of adjustment when increasing the preload is to the upper right in FIG. 4.

Now, when the increase in preloading is made to such an extent that the coupling element 70 exceeds the end of the threaded section 61, the threaded receptacle 76 of the coupling element 70 disengages from the threaded section 61. In the present case, an extension 62 is provided on the preloading element 60 adjacent to the threaded section 61.

The threaded receptacle 76 of the coupling body 70 may then rotate freely on the extension 62, which does not carry threads, but is held in its orientation by the extension 62 and is secured against loss. Further actuation of the preloading element 60 in the preloading direction no longer increases the preload of the spring element 50. However, starting from this position, the threaded receptacle 76 may be brought back into engagement with the threaded portion 61 of the preloading element 60 when the tool 65 is actuated in the opposite direction. Thus, the preload of the spring element 50 may be reduced.

If the preloading of the spring element 50 is now reduced to such an extent that the coupling body 70 comes into contact with the head 63 of the preloading element 60, the design of the coupling body 70 and the spring bearing 80 may prevent further actuation from damaging the adjusting mechanism 90 and/or the second arm section 20.

A further rotation of the preloading element 60 in the direction of the reduction of the preloading leads in the present case to a further rotation of the coupling body 70. The elevations 74 of the coupling body 70 may in this case be disengaged from the recesses 84 of the spring bearing 80. Consequently, there is a releasable connection in the circumferential direction of the threaded section 61 of the preloading element 60. The effects of excessively high operating forces introduced into the adjustment mechanism 90 via the tool 65 may also be effectively prevented in this way.

The invention claimed is:

1. A furniture fitting, comprising:
a spring element; and
an adjustment mechanism including:
a spring bearing configured to support the spring element;
a preloading element configured to adjust a position of the spring bearing to adjust a preloading of the spring element;
a coupling body adjustable in position relative to the preloading element;
the coupling body having a first releasable form-fitting and/or frictional connection with the spring bearing at least temporarily during adjustment of the position of the spring bearing, the first releasable form-fitting and/or frictional connection being releasable in a circumferential direction so that the coupling body may rotate relative to the spring bearing; and
the coupling body having a second releasable form-fitting connection with the preloading element.

2. The furniture fitting of claim 1, wherein:
the preloading element includes an externally threaded section; and
the coupling body includes an internally threaded receptacle;
wherein the second releasable form-fitting connection between the coupling body and the preloading element is provided by the threaded section of the preloading element being threadedly engaged in the internally threaded receptacle of the coupling body, such that the position of the coupling body relative to the preloading element is adjustable by adjusting the threaded engagement between the preloading element and the coupling body.

3. The furniture fitting of claim 2, wherein:
the externally threaded section of the preloading element is adjoined by a non-threaded extension having a smaller outer perimeter than the externally threaded section.

4. The furniture fitting of claim 2, wherein:
the spring bearing includes a non-threaded receiving bore; and
the preloading element is received through the receiving bore.

5. The furniture fitting of claim 1, wherein:
the coupling body includes one or more coupling elements;
the spring bearing includes one or more counter-coupling elements at least partially corresponding to the coupling elements; and
wherein the first releasable form-fitting and/or frictional connection between the coupling body and the spring bearing is formed by the one or more coupling elements being at least partially and/or temporarily in engagement with the one or more counter-coupling elements during the adjustment of the position of the spring bearing.

6. The furniture fitting of claim 5, wherein:
the one or more coupling elements are formed as one or more elevations and the one or more counter-coupling elements are formed as one or more recesses; or
the one or more coupling elements are formed as one or more recesses and the one or more counter-coupling elements are formed as one or more elevations.

7. The furniture fitting of claim 5, wherein:
the one or more coupling elements includes a plurality of coupling elements extending radially and spaced apart from one another in a circumferential direction.

8. The furniture fitting of claim 1, wherein:
the spring bearing includes a base body and a cylindrical guide projection extending from the base body, the guide projection having a smaller outer perimeter than the base body.

9. The furniture fitting of claim 8, wherein:
the spring element is received on the guide projection of the spring bearing and is supported on the base body of the spring bearing.

10. The furniture fitting of claim 1, wherein:
the preloading element includes a head, the head including an engagement structure formed by protrusions and depressions, the engagement structure being configured to be engaged by a tool aligned with and perpendicular to a central longitudinal axis of the preloading element.

11. The furniture fitting of claim 1, wherein:
the coupling body includes a disc body and a centering projection extending from a side of the disc body facing the spring bearing, the centering projection having a smaller outer perimeter than the disc body; and
the spring bearing includes on a side of the spring bearing facing the coupling body a centering receptacle configured to receive the centering projection.

12. The furniture fitting of claim 1, further comprising:
an arm section including a cylindrical receptacle;
wherein the preloading element includes a head rotatably received in the cylindrical receptacle of the arm section; and wherein the arm section further includes a cylindrical tool opening configured to receive a tool such that the tool is supported in engagement with the head of the preloading element.

13. The furniture fitting of claim 1, further comprising:

an arm section;

a control part;

a thrust piece slidably received in the arm section and engaged with the control part; and wherein the spring element includes a first spring end supported on the spring bearing and a second spring end supported on the thrust piece such that the thrust piece at least partially transmits a preloading force of the spring element to the control part.

14. A furniture fitting, comprising:

a spring element; and an adjustment mechanism including:

a spring bearing configured to support the spring element;

a preloading element configured to adjust a position of the spring bearing to adjust a preloading of the spring element;

a coupling body adjustable in position relative to the preloading element;

the coupling body having a first releasable form-fitting and/or frictional connection with the spring bearing at least temporarily during adjustment of the position of the spring bearing; and the coupling body having a second releasable form-fitting connection with the preloading element;

wherein the spring bearing includes a base body and one or more projections extending from the base body and having one or more guide surfaces defined on the one or more projections, and/or the base body includes one or more spring bearing sliding surfaces defined on the base body.

15. The furniture fitting of claim 14, further comprising:

an arm section including one or more guide regions for guiding the one or more spring bearing sliding surfaces and/or one or more spring bearing counter surfaces for guiding the one or more guide surfaces.

16. A furniture fitting, comprising:

a spring element; and an adjustment mechanism including:

a spring bearing configured to support the spring element;

a preloading element configured to adjust a position of the spring bearing to adjust a preloading of the spring element;

a coupling body adjustable in position relative to the preloading element;

the coupling body having a first releasable form-fitting and/or frictional connection with the spring bearing at least temporarily during adjustment of the position of the spring bearing; and the coupling body having a second releasable form-fitting connection with the preloading element;

wherein the spring bearing includes a base body and one or more guide lugs extending from the base body.

17. The furniture fitting of claim 16, further comprising:

an arm section including one or more guide slots for guiding the one or more guide lugs.

* * * * *